(12) United States Patent
Krueger

(10) Patent No.: US 6,922,944 B1
(45) Date of Patent: Aug. 2, 2005

(54) POWERED ACCESS WINDOW FOR MACHINERY

(75) Inventor: Jeffery R. Krueger, Cleveland, WI (US)

(73) Assignee: Jackson Machine, Inc., Port Washington, WI (US)

( * ) Notice: Subject to any disclaimer, the term of this patent is extended or adjusted under 35 U.S.C. 154(b) by 0 days.

(21) Appl. No.: 10/429,591

(22) Filed: May 5, 2003

(51) Int. Cl.$^7$ ................................................ E06B 7/28
(52) U.S. Cl. ............................ 49/171; 49/163; 49/349; 49/360
(58) Field of Search .......................... 49/149, 152, 155, 49/163, 168, 169, 142, 360, 362, 348, 349, 49/171

(56) References Cited

U.S. PATENT DOCUMENTS

| | | | | |
|---|---|---|---|---|
| 3,762,099 A | * | 10/1973 | Chaisson | ..................... 49/360 |
| 4,669,222 A | * | 6/1987 | Ujihara et al. | ................. 49/374 |
| 4,691,475 A | * | 9/1987 | Maekawa | ..................... 49/352 |
| 4,716,681 A | * | 1/1988 | Ugawa | ......................... 49/349 |
| 6,477,806 B1 | * | 11/2002 | Asada et al. | ................... 49/169 |

* cited by examiner

Primary Examiner—Jerry Redman
(74) Attorney, Agent, or Firm—Donald J. Ersler

(57) ABSTRACT

A powered access window for machinery includes a powered window pane, two track members, an actuation device. The powered access window replaces a window pane in a sliding door of an automatic safety door. Each track member extends from an opposing end of the sliding door. Preferably, at least two roller bars are slidably received by a roller track member. The roller bars are also attached to one end of the powered window pane. The other end of the powered window pane is slidably retained by a retention track member. The actuation device is preferably attached to the roller track member. An actuation member of the actuation device is attached to the one end of the powered window pane. The actuation member makes a lateral motion relative to a body of the actuation device to raise and lower the powered window pane.

11 Claims, 9 Drawing Sheets

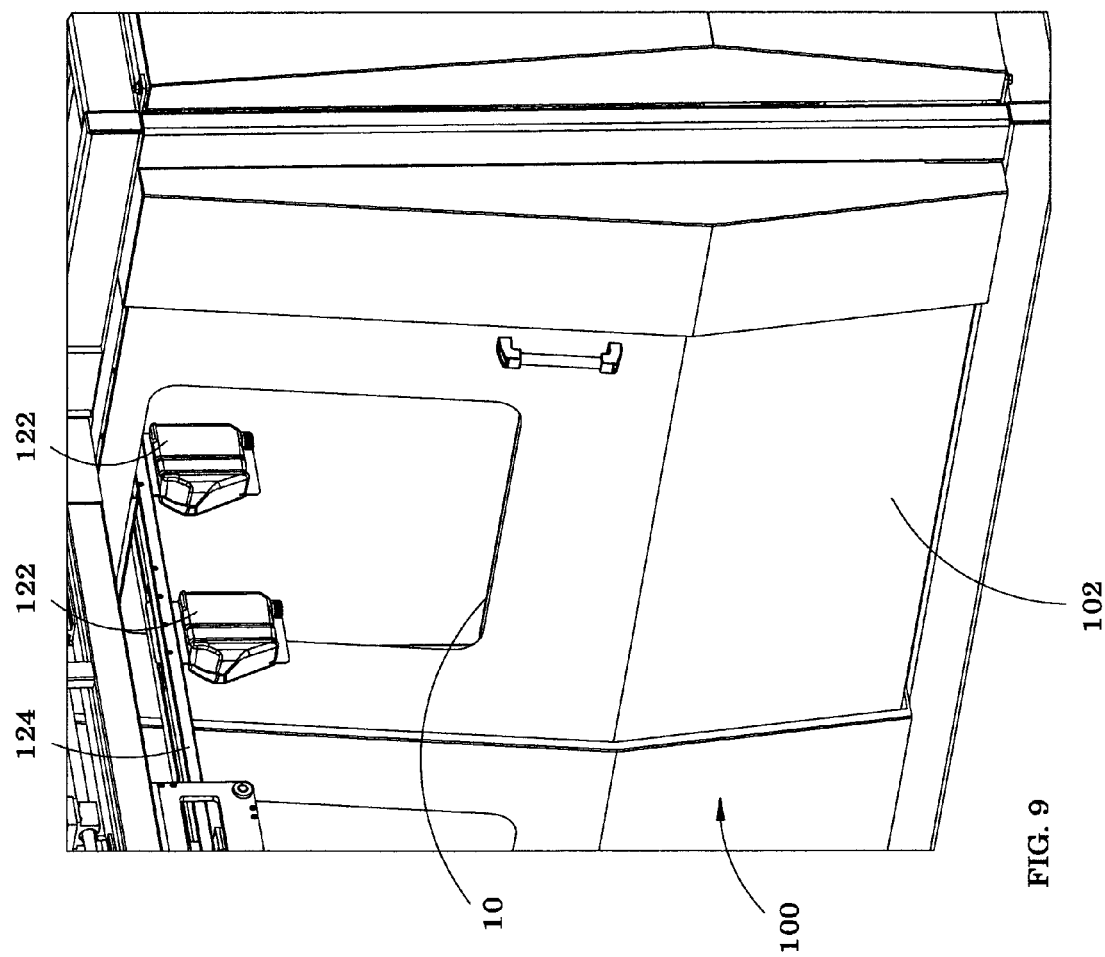

POWERED ACCESS WINDOW FOR MACHINERY

BACKGROUND OF THE INVENTION

1. Field of the Invention

The present invention relates generally to automatic safety doors for machinery and more specifically to a powered access window for machinery, which allows a piece part to be removed from a machine without having to open a large sliding door.

2. Discussion of the Prior Art

Automatic safety doors are used on machinery to protect laborers from injury. The automatic safety doors will open every time a piece part is removed from a machine. The automatic safety doors must also be used with a detection device such as a light bar or a safety mat. The detection device will shut down the machine, if someone tries to enter the machine when the automatic safety door is open. Even with the detection device the automatic safety door still has possible pinch points, which are capable of injuring a laborer.

Accordingly, there is a clearly felt need in the art for a powered access window for machinery, which does not require a detection device and does not have pinch points.

SUMMARY OF THE INVENTION

The present invention provides a powered access window for machinery, which does not have pinch points. The powered access window for machinery (powered access window) includes a powered window pane, a roller track member, a retention track member, and an actuation device. The powered access window replaces a window pane in a sliding door of an automatic safety door. Each track member extends from an opposing end of the sliding door. Preferably, at least two roller bars are slidably received by the roller track member. The roller bars are also attached to one end of the powered window pane. The other end of the powered window pane is slidably retained by the retention track member. The actuation device is preferably attached to the roller track member. An actuation member of the actuation device is attached to the one end of the powered window pane. The actuation device moves the actuation member with a lateral motion relative to a body of the actuation device. The downward motion of the powered window pane is preferably terminated with at least one adjustable cushion stop attached to a bottom of one or both track members.

The powered access window preferably operates in the following manner. The window pane in the sliding door of the automatic safety door is removed to reveal a window opening. The powered access window is installed in the sliding door, such that a small gap is created between a top of the window opening and a top of the powered window pane, when the powered window pane is in a fully raised orientation. The roller track member is preferably attached to one end of the sliding door utilizing a plurality of spacers and fasteners. The retention track member is preferably attached to the other end of the sliding door with at least two spacers and a plurality of fasteners. The actuation device is preferably pneumatic. A machine controls the actuation device for raising or lowering the powered window pane. The actuation device lowers the powered window pane when a piece part(s) is ejected from the machine with a part takeout device or the like and the actuation device raises the powered window pane, when the part ejection process is completed. The sliding door may also be automatically or manually opened to gain access to the guarded area of the machine.

Accordingly, it is an object of the present invention to provide a powered access window, which allows a piece part to be removed from a machine without having to open a large sliding door.

It is a further object of the present invention to provide a powered access window for machinery, which does not require a detection device for protecting a laborer.

Finally, it is another object of the present invention to provide a powered access window for machinery, which does not have pinch points.

These and additional objects, advantages, features and benefits of the present invention will become apparent from the following specification.

BRIEF DESCRIPTION OF THE DRAWINGS

FIG. 9 is a front perspective view of an automatic safety door with two piece parts being removed through a window opening, when the powered access window is lowered in accordance with the present invention.

DETAILED DESCRIPTION OF THE PREFERRED EMBODIMENTS

Figure 1:
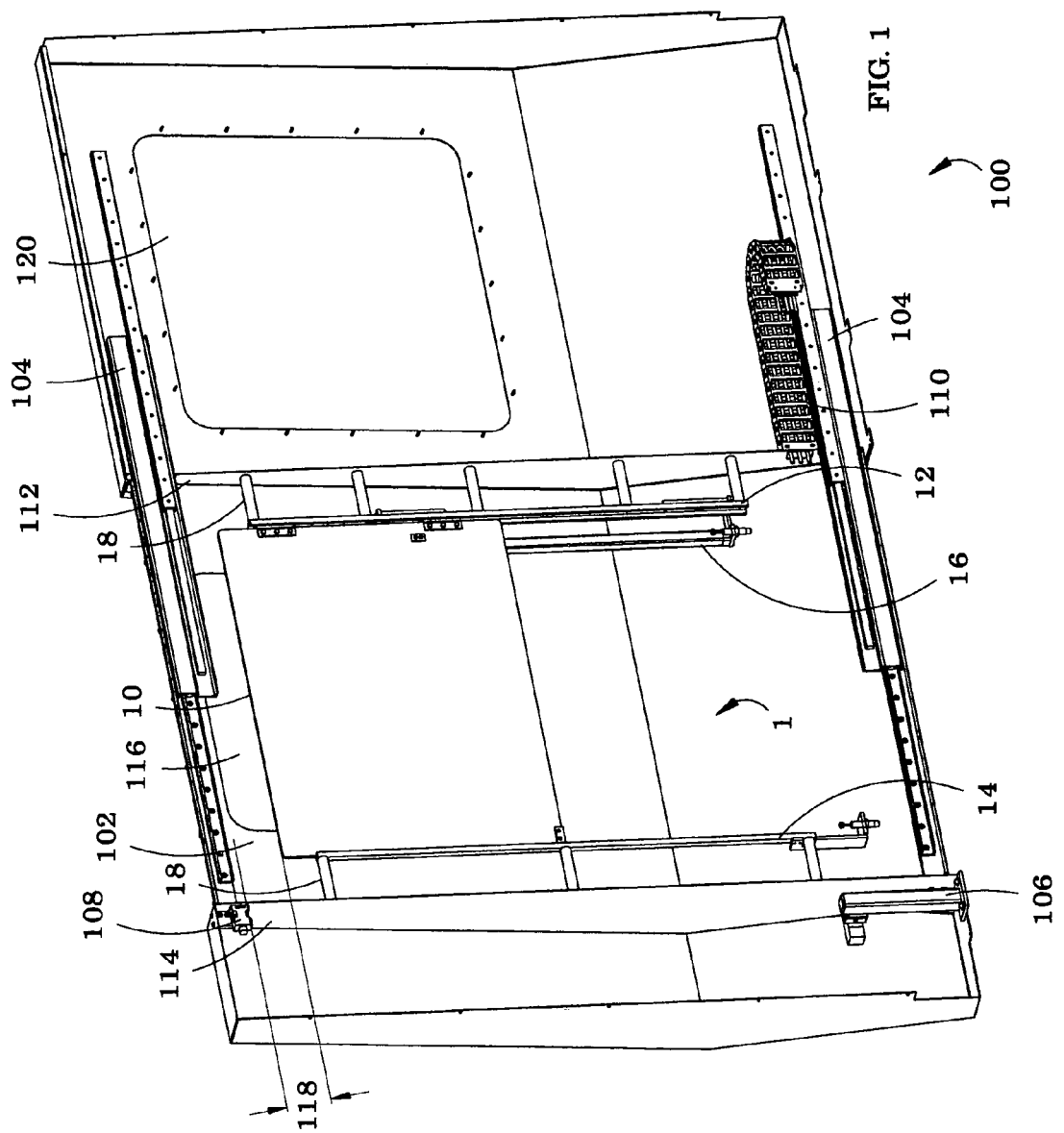
FIG. 1 is a rear perspective view of a powered access window in a raised orientation and installed in an automatic safety door in accordance with the present invention.
Figure 2:
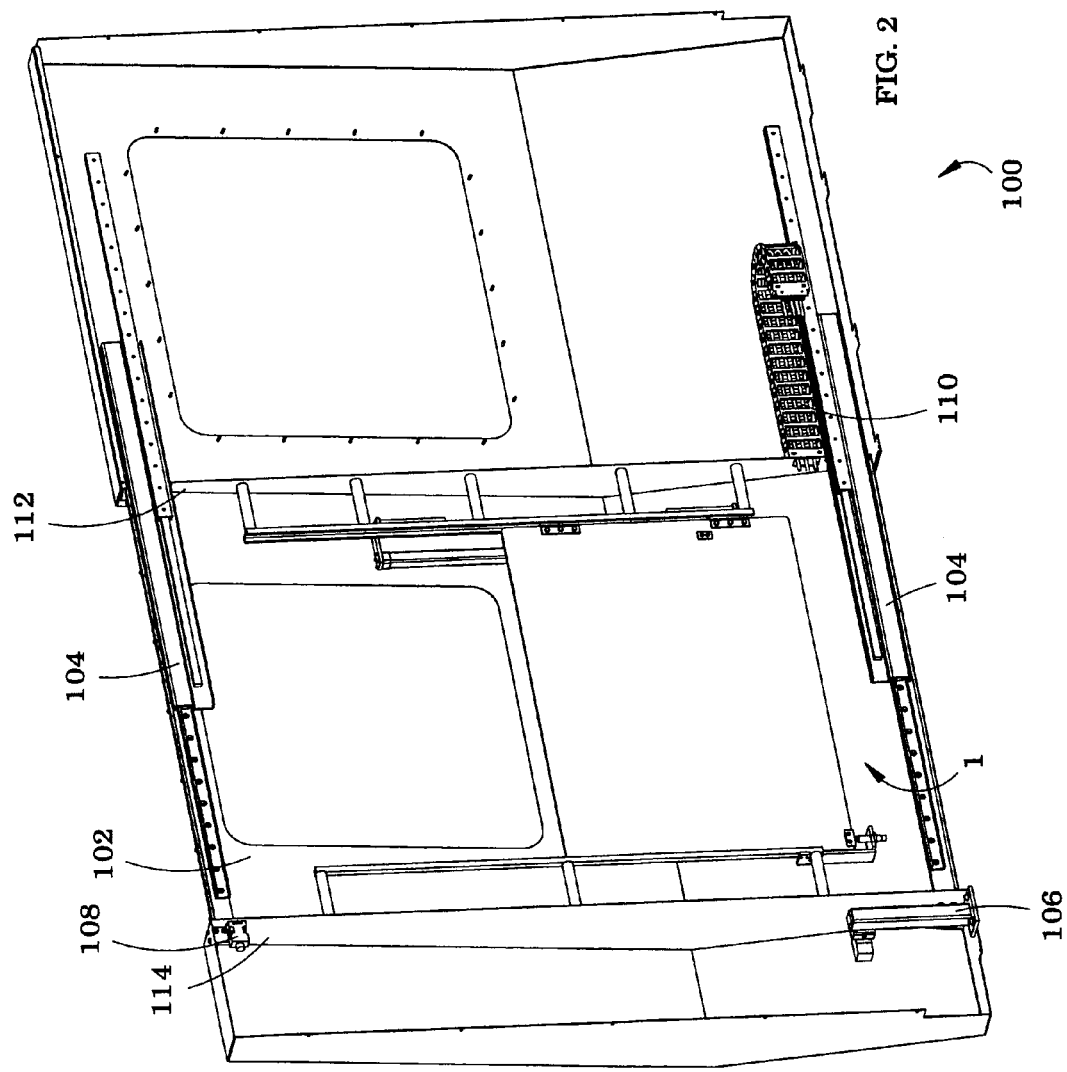
FIG. 2 is a rear perspective view of a powered access window in a lowered orientation and installed in an automatic safety door in accordance with the present invention.
Figure 3:
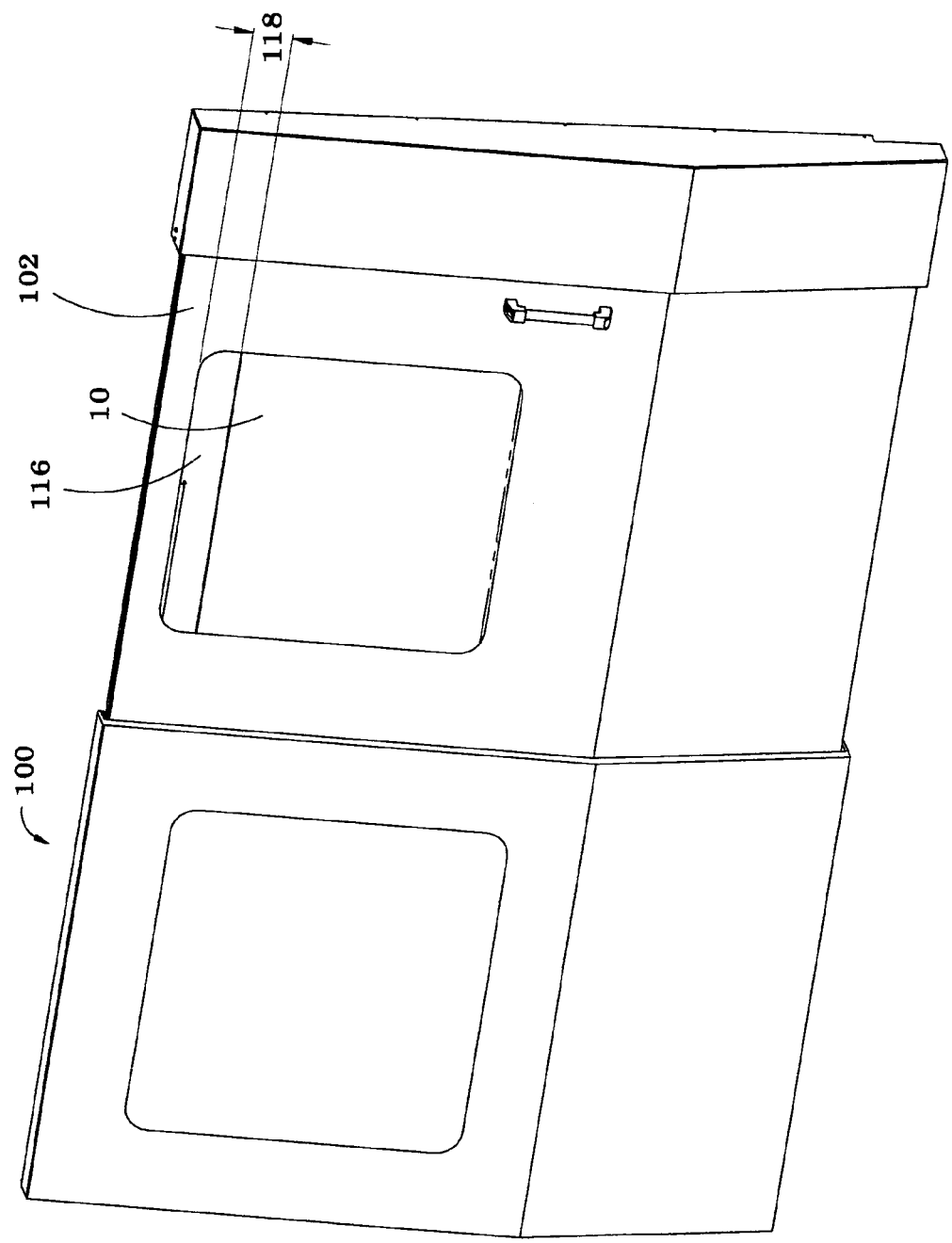
FIG. 3 is a front perspective view of a powered access window in a raised orientation and installed in an automatic safety door in accordance with the present invention.

With reference now to the drawings, and particularly to FIG. 1, there is shown a rear perspective view of a powered access window 1 in a raised orientation and installed in a sliding door 102 of an automatic safety door 100. With reference to FIGS. 2–3, a powered access window 1 includes a powered window pane 10, a roller track member 12, a retention track member 14 and an actuation device 16. The powered access window 1 replaces a window pane in the sliding door 102 of the automatic safety door 100. The powered window pane 10 is preferably fabricated from a clear plastic material, but other materials may also be used. The actuation device 16 is preferably a pneumatic rod less cylinder, but other devices may also be used. The sliding door 102 is slidably retained by the automatic safety door 100 with a pair of sliding tracks 104. A dump valve 106 and a position switch 108 are preferably used to determine whether the sliding door 102 is open. A folding electrical track 110 is used to retain wires and air lines used to operate the actuation device 16, the dump valve 106 and the position switch 108. The roller track member 12 is preferably mounted to a first flange end 112 of the sliding door 102 with a plurality of spacers 18 and fasteners.

Figure 4:
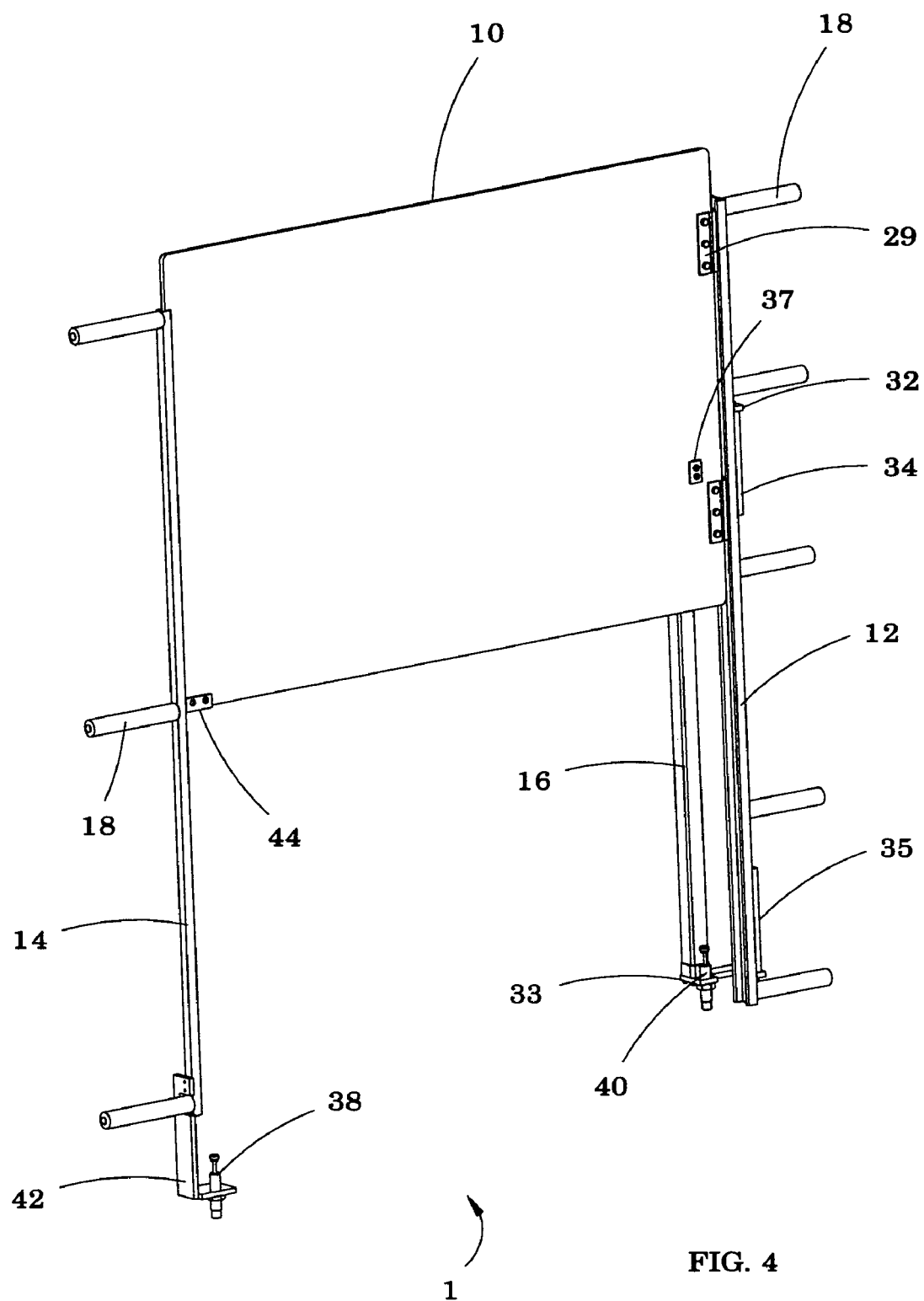
FIG. 4 is a rear perspective view of a powered access window in a raised orientation in accordance with the present invention.
Figure 5:
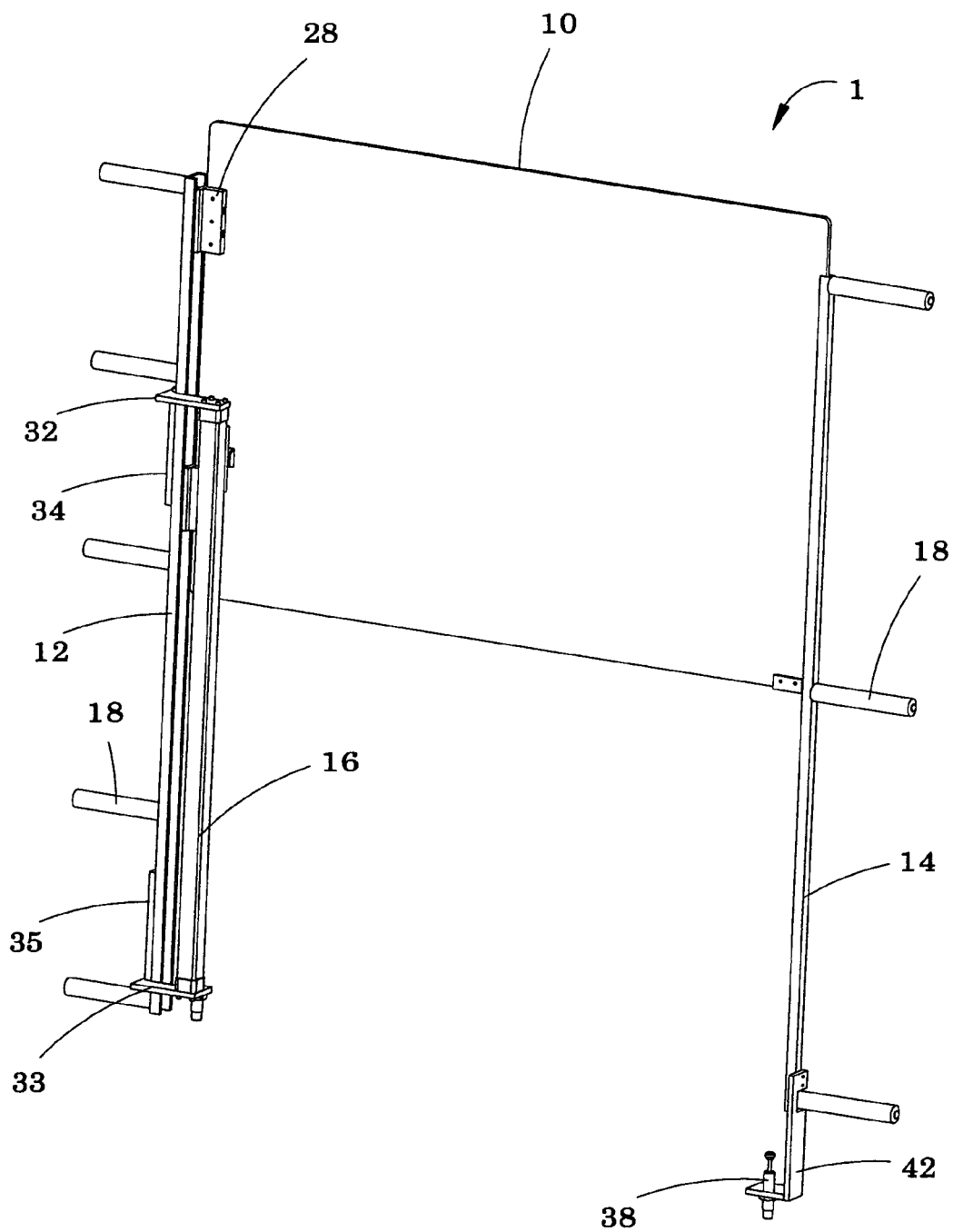
FIG. 5 is a front perspective view of a powered access window in a raised orientation in accordance with the present invention.
Figure 6:
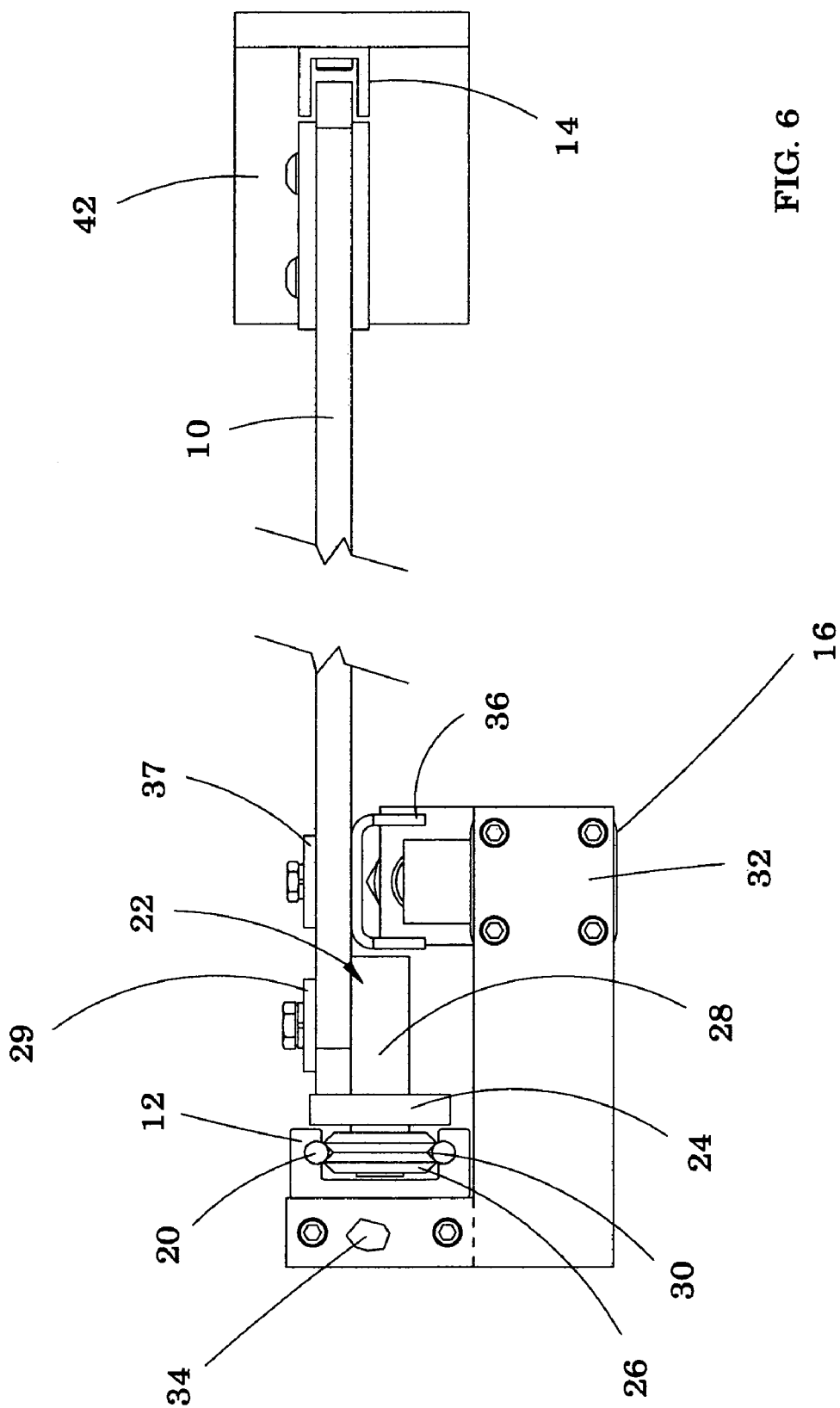
FIG. 6 is a top view of a powered access window in accordance with the present invention.

With reference to FIGS. 4–6, the roller track member 12 includes a substantially U-shaped cross section with a bearing rod 20 retained in opposing sides of an inner perimeter of the roller track member 12. A roller bar 22 includes a roller base 24, at least one roller 26 and an attachment plate 28. The at least one roller 26 is rotatably attached to one side of the roller base 24 and the attachment plate 28 is attached to the other side thereof, preferably with fasteners or the like. A grooved inner perimeter 30 is formed in substantially a middle of each one of the at least one roller 26. The grooved inner perimeter 30 is sized to receive the bearing rod 20. The attachment plate 28 is attached to one end of the powered window pane 10 with a pressure plate 29 and fasteners or the like. The pressure plate 29 is preferably used to protect the powered window pane 10 from damage from the fasteners. At least two roller bars 22 are used to slidably retain the one end of the powered window pane 10 relative to the roller track member 12.

The retention track member 14 is preferably mounted to a second flange end 114 of the sliding door 102 with at least two spacers 18 and fasteners. The retention track member 14 includes a substantially U-shaped cross section. The other end of the powered window pane 10 is retained in the retention track member 14, but other devices may also be used. The roller track member 12 and the retention track member 14 are preferably purchased from Pacific Bearing of Rockford, Ill. The roller base 24 and at least one roller 26 and the attachment plate 28 are preferably purchased as a single unit from Pacific Bearing.

Figure 7:
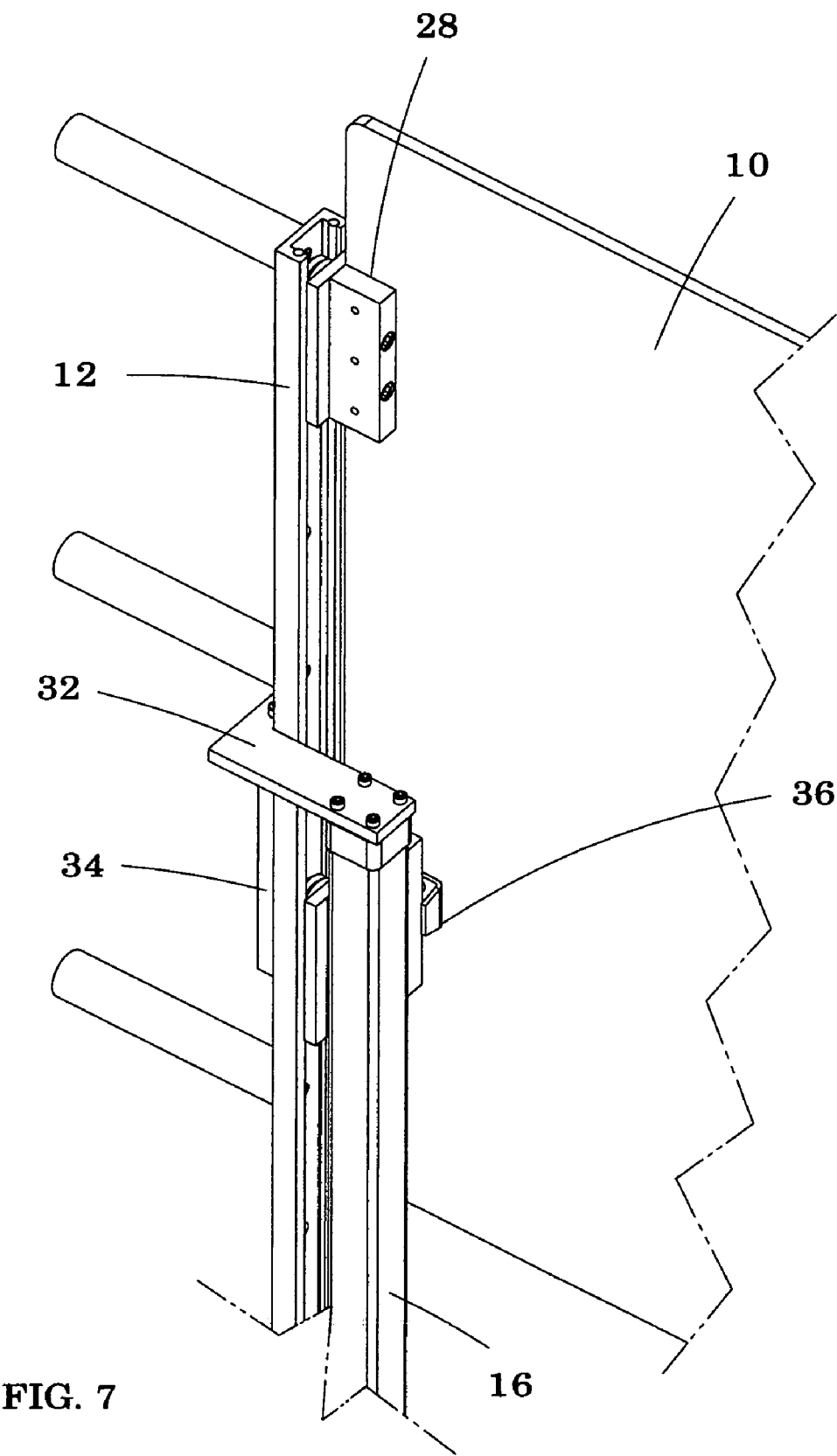
FIG. 7 is an enlarged partial front perspective view of a roller track member of a powered access window in accordance with the present invention.
Figure 8:
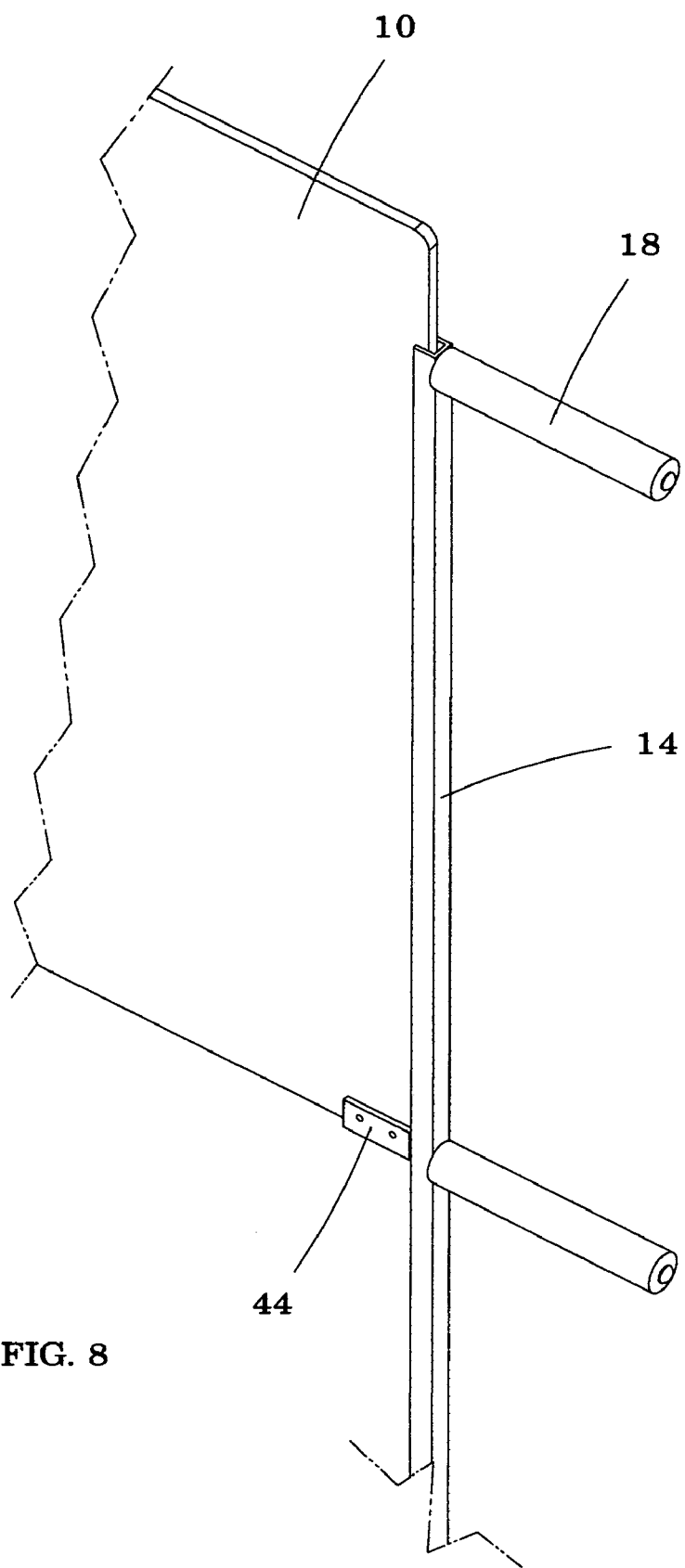
FIG. 8 is an enlarged partial front perspective view of a retention track member of a powered access window in accordance with the present invention.

With reference to FIGS. 7–8, the actuation device 16 is preferably attached to the roller track member 12 with a first L-bracket 32, a second L-bracket 33, a first mounting block 34 and a second mounting block 35. The first mounting block 34 is attached to substantially a top of the roller track member 12 on a back thereof. The second mounting block 35 is attached to a bottom of the roller track member 12 on a back thereof. One end of the first L-bracket 32 is attached to an end of the first mounting block 34 and the other end of the first L-bracket 32 is attached to a top of the actuation device 16. One end of the second L-bracket 33 is attached to an end of the second mounting block 35 and the other end of the second L-bracket 33 is attached to a bottom of the actuation device 16. An actuation member 36 of the actuation device 16 is secured to the powered window pane 10 with an actuation pressure plate 37 and fasteners or the like. The actuation pressure plate 37 is preferably used to protect the powered window pane 10 from damage from the fasteners. The actuation device 16 moves the actuation member 36 with a lateral motion relative to a body of the actuation device 16 to raise and lower the powered window pane 10.

The downward motion of the powered window pane 10 is preferably terminated with a pane adjustable cushion stop 38 and a member adjustable cushion stop 40. The pane adjustable cushion stop 38 is retained relative to the retention track member 14 with a stop bracket 42. The stop bracket 42 is attached to the retention track member 14 with any suitable fastening method. An impact bracket 44 is attached to a bottom of the powered window pane 10, such that a top of the pane adjustable cushion stop 38 contacts thereof. The impact bracket 44 prevents a bottom of the powered window pane 10 from being damaged. The member adjustable cushion stop 40 is retained in the second L-bracket 33. The actuation member 36 contacts the member adjustable cushion stop 40.

The powered access window 1 preferably operates in the following manner. The window pane in the sliding door 102 of the automatic safety door 100 is removed to reveal a window opening 116. The powered access window 1 is preferably installed in the sliding door 102, such that a small gap 118 is created between a top of the window opening 116 and a top of the powered window pane 10, when the powered window pane 10 is in a raised orientation. However, the powered access window 1 may completely cover the window opening 116. The location of the powered access window 1, whether fully covering the window opening 116 or substantially covering the window opening 116 is located adjacent the window opening 116. A machine controls the actuation device 16 for raising or lowering the powered window pane 10. With reference to FIG. 9, the actuation device 16 lowers the powered window pane 10 when two piece parts 122 are ejected from the machine with a part takeout device 124 and raises the powered window pane 10, when the part ejection process is completed. The sliding door 102 may also be automatically or manually opened to gain access to the guarded area of the machine.

The figures disclose the powered access window 1 installed adjacent the window opening 116. However, installation of the powered access window 1 should include a second window 120 in the automatic safety door 100.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A powered access window in combination with an automatic safety door, comprising:
    said automatic safety door having a sliding door, at least one window opening being formed in said sliding door;
    a first track member being attached to one end of said sliding door;
    a second track member being attached to the other end of said sliding door;
    a window pane being slidably retained by said first and second track members, a small gap being formed between a top of said window pane and a top of said window opening when said window pane is in a fully raised orientation; and
    an actuation device controlling the movement of said window pane relative to said first and second track members.

2. The powered access window in combination with an automatic safety door of claim 1, further comprising:
    at least two roller bars being slidably engaged with said first track member, an end of said window pane being retained by said at least two roller bars.

3. The powered access window in combination with an automatic safety door of claim 1, further comprising:
    said first track member being secured to a first flange adjacent one end of said window opening with a plurality of spacers, said second track member being secured to a second flange adjacent the other end of said window opening with at least two spacers.

4. The powered access window in combination with an automatic safety door of claim 1, further comprising:
   at least one adjustable cushion stop preventing the window pane from falling out of said first and second sliding tracks.

5. A powered access window in combination with an automatic safety door, comprising:
   said automatic safety door having a sliding door, at least one window opening being formed in said sliding door;
   a first track member being attached to one end of said sliding door;
   a second track member being attached to the other end of said sliding door;
   a window pane being slidably retained between said first and second track members, a gap being formed between a top of said window pane and a top of said window opening when said window pane is in a fully raised orientation; and
   an actuation device controlling the movement of said window pane relative to said first and second track members.

6. The powered access window in combination with an automatic safety door of claim 5, further comprising:
   at least two roller bars being slidably engaged with said first track member, an end of said window pane being retained by said at least two roller bars.

7. The powered access window in combination with an automatic safety door of claim 5, further comprising:
   said first track member being secured to a first flange adjacent one end of said window opening with a plurality of spacers, said second track member being secured to a second flange adjacent the other end of said window opening with at least two spacers.

8. The powered access window in combination with an automatic safety door of claim 5, further comprising:
   at least one adjustable cushion stop preventing the window pane from falling out of said first and second sliding tracks.

9. A powered access window in combination with an automatic safety door, comprising:
   said automatic safety door having a sliding door, at least one window opening being formed in said sliding door;
   a first track member being attached to one end of said sliding door;
   a second track member being attached to the other end of said sliding door a window pane being slidably retained between said first and second track members;
   at least two roller bars being slidably engaged with said first track member, one end of said window pane being retained by said at least two roller bars, the other end of said window pane being slidably retained by said second track member;
   a gap being formed between a top of said window pane and a top of said window opening when said window pane is in a fully raised orientation; and
   an actuation device controlling the movement of said window pane relative to said first and second track members.

10. The powered access window in combination with an automatic safety door of claim 9, further comprising:
    said first track member being secured to a first flange adjacent one end of said window opening with a plurality of spacers, said second track member being secured to a second flange adjacent the other end of said window opening with at least two spacers.

11. The powered access window in combination with an automatic safety door of claim 9, further comprising:
    at least one adjustable cushion stop preventing the window pane from falling out of said first and second sliding tracks.

\* \* \* \* \*